Nov. 10, 1931.    N. BLOUNT    1,831,377

TELEPHONE RECEIVER

Filed Aug. 11, 1930

INVENTOR
N. BLOUNT
BY
Walter C. Kiesel
ATTORNEY

Patented Nov. 10, 1931

1,831,377

UNITED STATES PATENT OFFICE

NELSON BLOUNT, OF MAPLEWOOD, NEW JERSEY, ASSIGNOR TO BELL TELEPHONE LABORATORIES, INCORPORATED, OF NEW YORK, N. Y., A CORPORATION OF NEW YORK

TELEPHONE RECEIVER

Application filed August 11, 1930. Serial No. 474,346.

This invention relates to telephone receivers and more particularly to such receivers embodying a casing of relatively brittle material and a permanent magnet within the casing.

Telephone receivers of the type commonly employed in telephone desk and wall sets comprise a casing of molded material, such as hard rubber, phenol condensate or the like, having a flared open end, and a permanent bar magnet supported from the flared end and extending lengthwise of the casing and out of contact therewith. It has been found that when the receiver is accidentally dropped or struck against a heavy object, the free end of the magnet strikes the relatively brittle casing sharply and causes breakage thereof. This decreases the normal life of telephone receivers, necessitates the frequent replacement thereof, and hence adds materially to the maintenance cost of subscribers' sets and substation apparatus.

It is an object of this invention, therefore, to prevent breakage of the casing of telephone receivers and thereby obviate the frequent replacement thereof.

Figure 2:
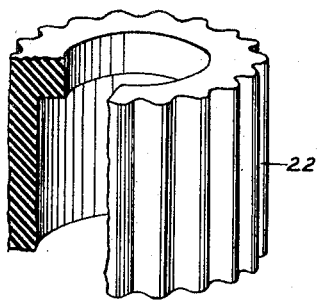
Figure 1:
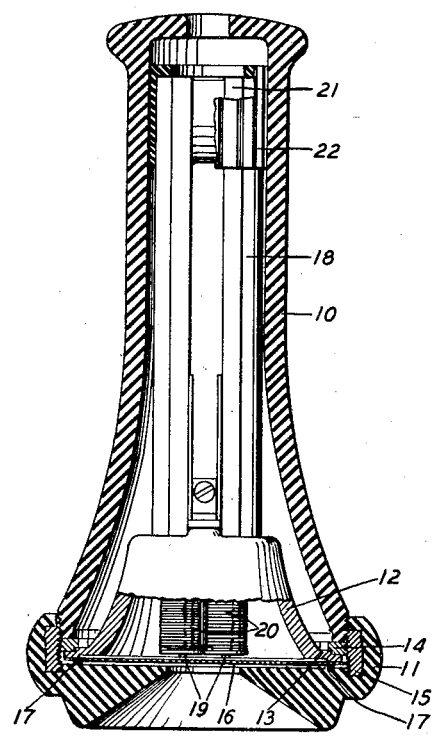

The invention will be clearly understood from the accompanying drawings in which Fig. 1 is a cross-sectional view in elevation of a telephone receiver embodying my invention and Fig. 2 is a perspective view of a preferred form of the buffer or shock absorbing means of my invention.

Referring to the drawings, the telephone receiver comprises a thin molded casing 10 of relatively brittle material, such as hard rubber, phenol condensate or the like, and a cap 11, likewise of hard rubber, phenol condensate or the like, internally threaded to the casing 10. A cup-shaped member 12 of nonmagnetic material has a flanged periphery 13 and is locked within the cap 11 by a metallic locking ring 14 engaging the flanged periphery 13 and threaded to a metallic reinforcing ring 15 embedded in the cap 11. A metallic diaphragm 16 is seated upon the periphery 13 of the cup-shaped member 12 and is locked in position against an annular ridge 17, integrally formed on the inner face of the cap, by the locking ring 14.

An elongated U-shaped permanent magnet 18 extending lengthwise of the casing 10 is welded to the cup member 12 and has pole pieces 19 disposed within the cup member 12 and for supporting the speech current carrying windings 20.

The permanent magnet 18 is relatively heavy and it has been found that when the receiver is dropped or accidentally struck against a heavy object, the end 21 of the magnet 18 strikes the brittle casing 10 sharply and cracks or completely breaks the casing. In order to eliminate this breakage, and materially increase the life of the receiver, in accordance with this invention, a buffer 22 of resilient material is provided about the end 21 of the magnet 18 in engagement therewith and the casing 10. This buffer may take the form of a winding of resilient material such as rubber tape or may comprise a flexible cap. In a preferred form shown in Fig. 2, the buffer 22 comprises a soft rubber cap, the body portion of which is corrugated to reinforce it and insure good engagement with the casing 10 at all times by taking up minor variations in the space between the magnet 18 and the casing 10 occasioned by manufacturing tolerances.

In devices of this construction, when the receiver is accidentally dropped or struck, the buffer 22 prevents contact of the end 21 of the magnet 18 with the fragile casing 10 and thereby prevents cracking or breakage of the casing.

What is claimed is:

1. A telephone receiver comprising a casing, a magnet within said casing extending lengthwise thereof, and a soft rubber cap affixed about an end of said magnet and in engagement with said casing.

2. A telephone receiver comprising a casing, a cap therefor, a cup shaped member locked to said cap, a magnet supported from said cup shaped member and extending lengthwise of said casing, and resilient means mounted on said magnet for preventing sharp contact of said magnet and casing when the receiver is subjected to a blow.

3. A telephone receiver comprising a casing, a magnet positioned therein, and a resilient corrugated member encircling said magnet and in engagement with said casing.

4. A telephone receiver comprising a casing, a magnet positioned therein, and a soft rubber cap affixed about an end of said magnet and in engagement with said casing, the outer surface of the sides of said cap being provided with corrugations extending lengthwise thereof.

In witness whereof, I hereunto subscribe my name this 16th day of August, 1930.

NELSON BLOUNT.